(12) United States Patent
Gai et al.

(10) Patent No.: US 12,327,656 B2
(45) Date of Patent: Jun. 10, 2025

(54) METHOD FOR MANUFACTURING HIGH-PRECISION MARINE CONDUCTIVITY MEASUREMENT ELECTRODE BASED ON SCREEN PRINTING

(71) Applicant: INSTITUTE OF OCEANOGRAPHIC INSTRUMENTATION, SHANDONG ACADEMY OF SCIENCES, Qingdao (CN)

(72) Inventors: Zhigang Gai, Qingdao (CN); Fengxiang Guo, Qingdao (CN); Shousheng Liu, Qingdao (CN); Xueyu Zhang, Qingdao (CN); Yibao Wang, Qingdao (CN); Lili Zhang, Qingdao (CN); Guangsen Xia, Qingdao (CN); Xiaoling Sun, Qingdao (CN); Wei Sun, Qingdao (CN)

(73) Assignee: INSTITUTE OF OCEANOGRAPHIC INSTRUMENTATION, SHANDONG ACADEMY OF SCIENCES, Qingdao (CN)

( * ) Notice: Subject to any disclaimer, the term of this patent is extended or adjusted under 35 U.S.C. 154(b) by 293 days.

(21) Appl. No.: 18/113,087

(22) Filed: Feb. 23, 2023

(65) Prior Publication Data
US 2023/0207157 A1      Jun. 29, 2023

(30) Foreign Application Priority Data

Mar. 30, 2022   (CN) .......................... 202210320933.3

(51) Int. Cl.
| | | |
|---|---|---|
| H01B 13/00 | (2006.01) |
| B41F 15/14 | (2006.01) |
| H01B 1/22 | (2006.01) |
| H01B 5/14 | (2006.01) |
| G01N 27/07 | (2006.01) |

(52) U.S. Cl.
CPC ......... *H01B 13/0036* (2013.01); *B41F 15/14* (2013.01); *H01B 1/22* (2013.01); *H01B 5/14* (2013.01); *H01B 13/0016* (2013.01); *G01N 27/07* (2013.01)

(58) Field of Classification Search
None
See application file for complete search history.

(56) References Cited

U.S. PATENT DOCUMENTS 6,156,433 A * 12/2000 Hatori ....................... H01J 9/02
                                                              430/311
2011/0291670 A1   12/2011  Barnard et al.
2012/0019261 A1    1/2012  Bevilacqua, Jr. et al.
(Continued)

*Primary Examiner* — Binh X Tran
*Assistant Examiner* — Bradford M Gates

(57) ABSTRACT

The present invention relates to the technical field of conductivity measurement electrode preparation, and specifically discloses a method for manufacturing a high-precision marine conductivity measurement electrode based on screen printing. The method of the present invention can realize the preparation of a conductivity measurement electrode with high precision, short preparation time and less drop-out of the electrode, thereby meeting the requirements of the current marine observation network for the high-volume and high-precision application of the conductivity sensor.

10 Claims, 3 Drawing Sheets

(56) References Cited

U.S. PATENT DOCUMENTS

2016/0084785 A1    3/2016  Buckberry
2017/0104115 A1*  4/2017  Hayashi ................ H10F 77/703
2018/0238821 A1*  8/2018  Otomaru ............ G01N 15/0606

* cited by examiner

METHOD FOR MANUFACTURING HIGH-PRECISION MARINE CONDUCTIVITY MEASUREMENT ELECTRODE BASED ON SCREEN PRINTING

TECHNICAL FIELD

The present invention relates to the technical field of conductivity measurement electrode preparation, and in particular to a method for manufacturing a high-precision marine conductivity measurement electrode based on screen printing.

BACKGROUND

With the progress of science and technology, the marine environmental monitoring technology has been continuously updated and improved, and the performance of monitoring instruments has been greatly improved. The miniature marine float with high water surface density, miniaturization and low cost, and the networking observation technology thereof are receiving increasing attention. The research on the conductivity measurement technology has great significance in the aspects of marine science investigation, resource development and utilization, international marine cooperation research, military oceanographic application and the like. Miniaturization is an important development trend of the ocean conductivity sensor and is also an important way for realizing mass production of the sensor.

As a conventional printing technology, the screen printing, combined with microfluidic technology, can be used to prepare microelectrodes. Electrodes processed by using the screen printing technology have been widely applied to the field of integrated circuits. The electrode is an important part of various sensors. Compared with conventional electrode manufacturing technology, such as magnetron sputtering, chemical vapor deposition, FIB and mask lithography, screen printing electrode technology has the advantages of miniaturization of equipment, no need for professional personnel to operate, and is suitable for large-scale production. At the same time, screen printing technology has good substrate adaptability and process control.

The development of femtosecond laser technology in recent years has promoted the development of the manufacturing process of high-precision nondestructive screen printing metal screen plate. The femtosecond laser technology has the advantages of small heat-affected zone, high laser repetition frequency and high pulse energy, and can realize the high-flexibility, high-precision and high-efficiency microprocessing of various materials. It can not only process various hard and brittle materials with high precision without damage, but also make such materials have been widely applied to complex and precision fields.

At present, the current manufacturing technology of sensing electrodes for miniaturized conductivity sensor is mainly magnetron sputtering, chemical vapor deposition, FIB, mask lithography and the like based on MEMS technology to prepare thin membrane electrodes. The above methods have high requirements for equipment, need to use expensive equipment, require professional personnel to operate, and have long preparation time for the conductivity measurement electrode, and there are still defects in measurement repeatability, accuracy, easy drop-out of electrodes and the like, which can not fully meet the current marine strategy for the application of conductivity sensors.

SUMMARY

In order to solve the above technical problem, the present invention provides a method for manufacturing a high-precision marine conductivity measurement electrode based on screen printing, which can realize the preparation of a conductivity measurement electrode with high precision, short preparation time and less drop-out of the electrode, thereby meeting the requirements of the current marine observation network for the high-volume and high-precision application of the conductivity sensor.

In order to achieve the above objective, the technical schemes of the present invention are as follows:

A method for manufacturing a high-precision marine conductivity measurement electrode based on screen printing, comprising the following steps:

step I. preparing a screen printing screen plate: cutting micro-nano-scale array holes on a metal material sheet having a thickness of 0.5-1 mm by using a femtosecond laser technology to obtain the screen printing screen plate;

step II. preparing a platinum electrode slurry: mixing a nano platinum powder having an average particle size of 0.08 μm, a metal powder having a particle size of 0.1-0.3 μm, a metal oxide and an organic vehicle, dispersing and milling the mixture for 20-40 min in a three-roll mill, and discharging residual air under a vacuum degree of −80 KPa to −90 KPa by using a vacuum defoaming device to prepare the platinum electrode slurry;

step III. preparing an electrode carrier: selecting a silicon-based substrate, etching a groove having a depth of 0.2-0.4 μm on a surface of the silicon-based substrate, and performing a nitridation treatment on a surface of the groove as the electrode carrier;

step IV. printing the platinum electrode slurry onto the electrode carrier by using the prepared screen printing screen plate and a scraping plate on a semi-automatic screen printer, scraping off the platinum electrode slurry outside the groove, standing for 5-10 min, and forming a patterned membrane electrode having a micron-scale thickness after the platinum electrode slurry is leveled; and step V. placing the electrode carrier printed with the patterned membrane electrode in a blast drying oven for drying for 10-20 min at 115-135° C., and finally performing microwave sintering to obtain the conductivity measurement electrode.

In the above scheme, in the step I, the micro-nano-scale array hole has a diameter of 2.6-4.2 μm, and the obtained screen printing screen plate has a mesh number of 3000-5000.

In the above scheme, in the step II, the metal powder is ruthenium or iridium.

In the above scheme, in the step II, the organic vehicle is a mixture of an organic solvent and an organic binder, the mass ratio of the organic solvent to the organic binder is 60-80:20-40, and the organic solvent is one or more of terpineol, acetone and methyl ethyl ketone, the organic binder is one or more of ethyl cellulose, polyvinyl butyral and xylene; the metal oxide is one or more of $Na_2O$, MgO and $TiO_2$.

In the above scheme, in the step II, the mass ratio of the platinum powder, the metal powder, the metal oxide and the organic vehicle is 55-65:13-15:0.1-1:20-30.

In the above scheme, in the step III, a cross section of the groove is in a trapezoid shape with a wide upper part and a narrow lower part, and included angles between slope surfaces at two sides and a bottom surface of the groove are 10°-15°.

In the above scheme, in the step III, the nitridation treatment is performed by placing the silicon-based substrate in a nitrogen-containing medium at 500-540° C. for 15-70 h to allow newly formed active nitrogen atoms generated by decomposition of the medium to penetrate into a surface layer of the silicon-based substrate, so as to obtain a white bright layer having a thickness of 0.15-0.2 mm and a diffusion layer having a depth of 0-0.08 mm.

In the above scheme, in the step IV, the printing comprises specific steps as follows:

(1) cleaning the electrode carrier, the screen printing screen plate and the scraping plate for 10-20 min by applying 20 KMz to 40 KMz ultrasonic waves by using acetone, absolute ethanol and deionized water, and then putting the electrode carrier, the screen printing screen plate and the scraping plate into a fume hood for drying for 20-30 min at a temperature of 20-25° C.;

(2) adjusting an angle between the scraping plate and a printing surface of the screen printing screen plate to be 60-80°, and adjusting a distance between the screen printing screen plate and the electrode carrier to be 1-3 mm;

(3) operating the semi-automatic screen printer to enable a scraping plate blade to move forward at a speed of 0.1-0.5 cm/s, applying a pressure of 80-300 KPa, pushing the platinum electrode slurry to roll in front of the scraping plate, injecting the platinum electrode slurry into meshes of the screen printing screen plate so as to reach the electrode carrier, scraping off the platinum electrode slurry outside the groove, standing for 5-10 min to level the platinum electrode slurry, and forming a patterned membrane electrode having a micron-scale thickness.

In the above scheme, in the step V, the electrode carrier printed with the patterned membrane electrode is placed into a microwave sintering furnace for sintering at a microwave sintering frequency of 2.25-2.55 GHz, a sintering power of 0.8-1.2 kw and a microwave frequency range of 300 GHz to 300 MHz.

In the above scheme, in the step V, in the sintering process, the preparation of the conductivity measurement electrode is completed by heating to 550-650° C. at a temperature rising rate of 5-10° C./min and maintaining the temperature for 25-35 min, then heating to 900-1200° C. at a heating rate of 10-15° C./min and maintaining the temperature for 20-35 min, and naturally cooling to room temperature.

With the above technical schemes, the method for manufacturing a high-precision marine conductivity measurement electrode based on screen printing provided by the present invention has the following beneficial effects:

1. High measurement precision: the main body of the platinum electrode slurry uses a nano-platinum powder, which makes the surface of the platinum electrode more fine and uniform, and a small amount of metal powder such as ruthenium or iridium is doped, which makes the chemical properties of the electrode more stable and excellent in electrical conductivity. The square resistance is 22 mΩ/□. The measurement precision can reach 0.03-0.008 mS/cm.

2. Short preparation time, suitable for mass production: the present invention uses a semi-automatic screen printer for electrode preparation, and the scraping plate performs mechanical reciprocating printing of electrode slurry on the screen, so that the electrode preparation has a fast speed and short time, and the conductivity measurement electrodes can be mass-produced.

3. Less drop-out of the electrode: the adoption of the platinum electrode slurry composed of a nano-platinum powder, a metal powder, an inorganic additive and an organic vehicle, and the addition of a small amount of the inorganic additive without affecting the electrical conductivity of the platinum electrode in combination with the sintering process can significantly improve the adhesion of the conductivity platinum electrode, and effectively solve the problem of easy drop-out of the open electrode.

4. More accurate electrode positioning: the electrode groove is etched on the silicon-based substrate, so that the position of the electrode is more accurate, the shape of the electrode is more regular and fixed, the measurement of electromagnetic field potential line is more accurate, and the electrode precision is higher.

5. Strong repeatability: in the process of preparing the conductivity measurement electrode, the technical flow of screen printing has a high controllability, and the semi-automatic screen printer performs a mechanical operation under the conditions of consistent slurry, screen plate and parameters, so that there is a high repeatability between electrode chips.

BRIEF DESCRIPTION OF THE DRAWINGS

In order to more clearly illustrate technical schemes in examples of the present invention or in the prior art, the drawings used in the description of the examples or the prior art are briefly introduced below.

In the figures, 1 is a scraping plate; 2 is a platinum electrode slurry; 3 is a screen printing screen plate; 4 is an electrode carrier; 5 is a groove.

DETAILED DESCRIPTION

The technical schemes in the examples of the present invention will be clearly and completely described below with reference to the drawings in the examples of the present invention.

Example 1

Figure 1:
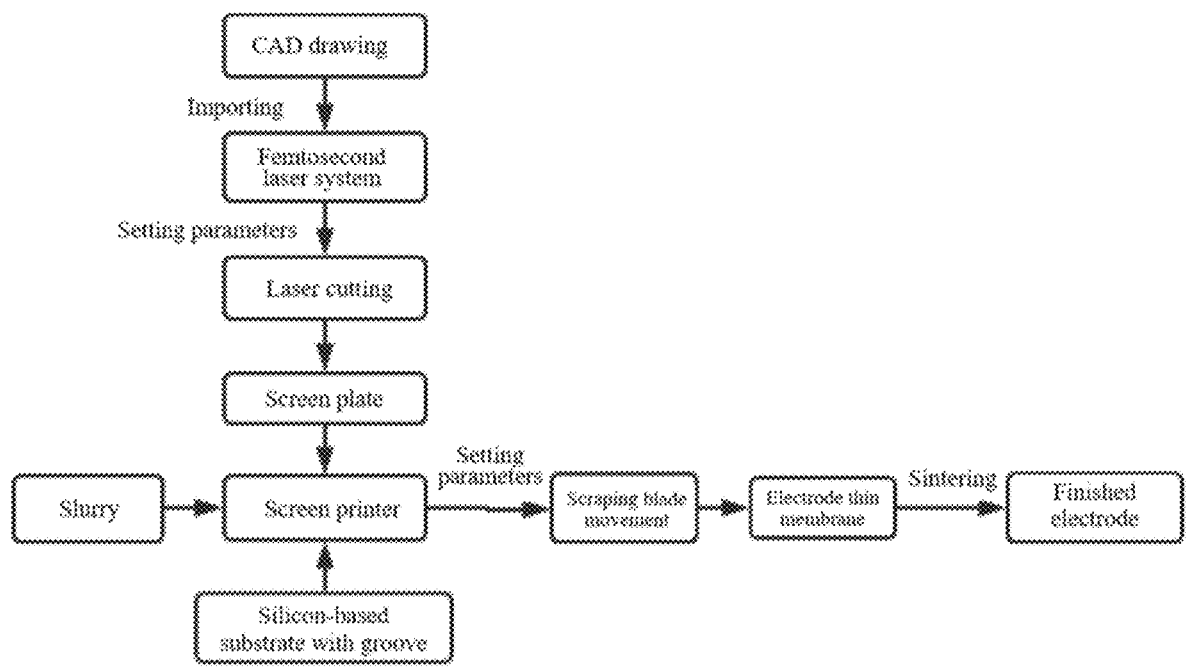
FIG. 1 is a schematic flow chart of a method for manufacturing a high-precision marine conductivity measurement electrode based on screen printing according to an example of the present invention.
Figure 2:
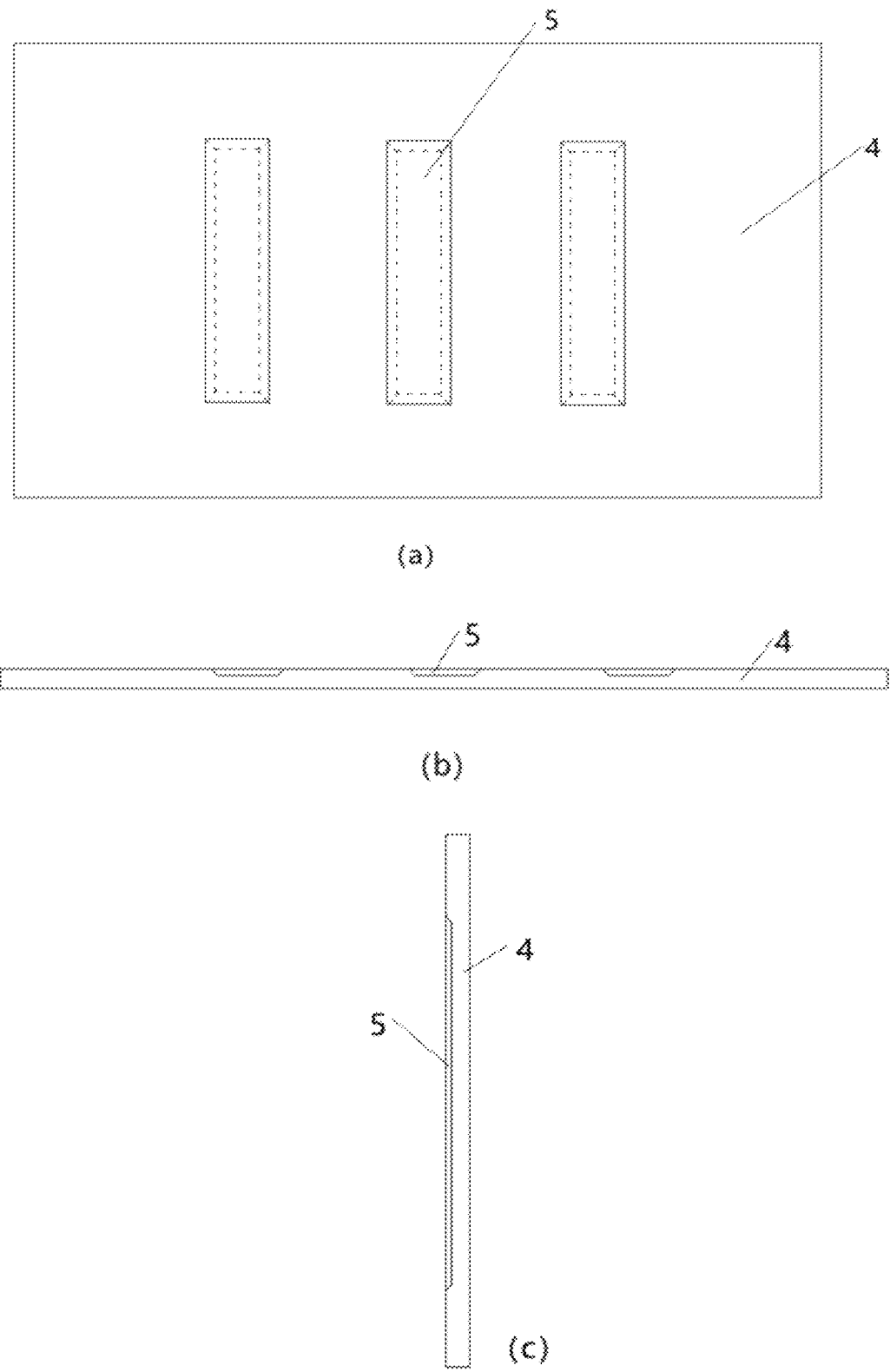
FIG. 2 is a structural diagram of an electrode carrier, wherein (a) is a top view, (b) is a front cross-sectional view, and (c) is a side cross-sectional view.
Figure 3:
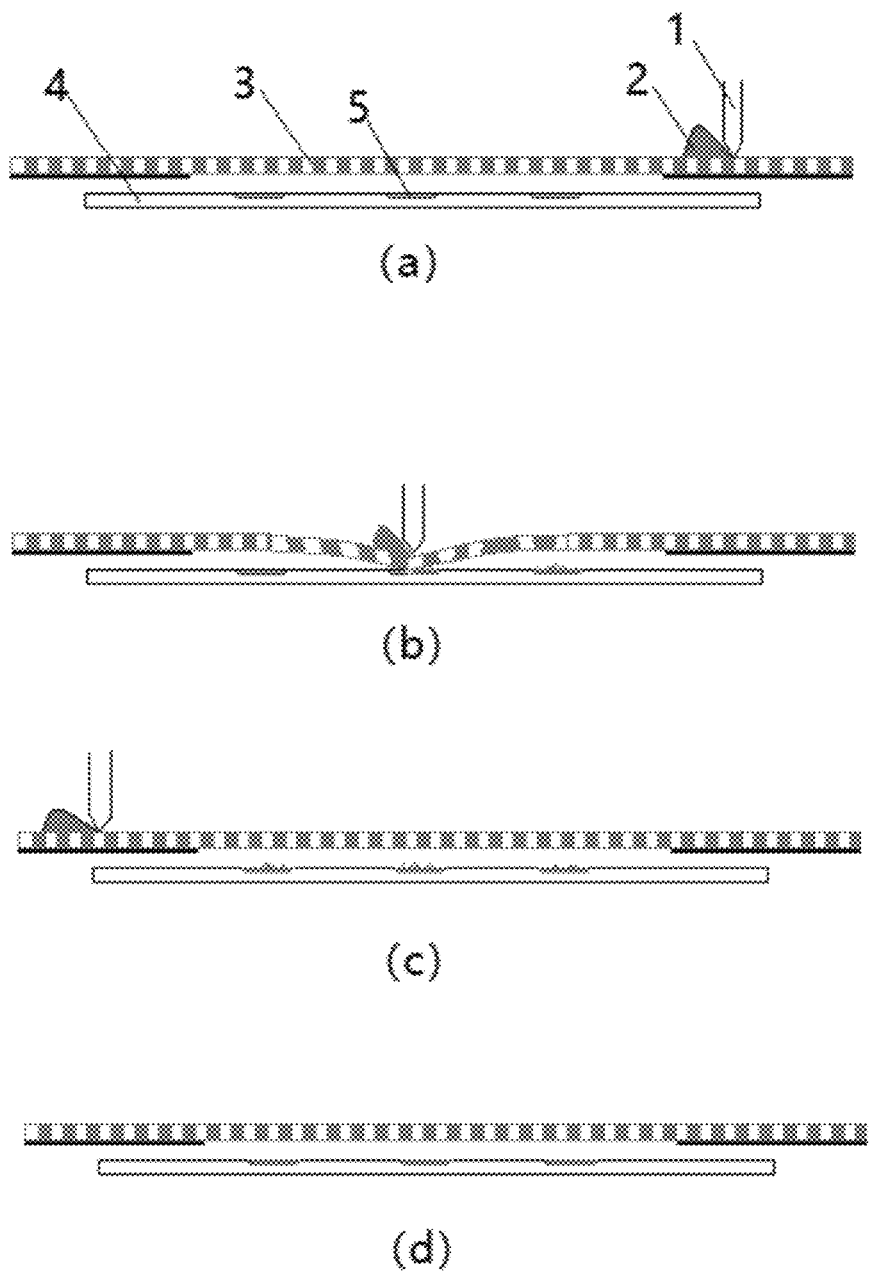
FIG. 3 is a schematic flow chart of screen printing, (a) represents an initial state, (b) represents a printing state, (c) represents a leveling state, and (d) represents a membrane-forming state.

The present invention provides a method for manufacturing a high-precision marine conductivity measurement electrode based on screen printing, as shown in FIG. 1, which comprises the following steps:

step I. preparing a screen printing screen plate 3:

importing the CAD conductivity measurement electrode pattern into a femtosecond laser system, wherein the pulse width of the femtosecond laser reached at a repetition rate of 500 MHz is 10-20 fs, and the metal material is highly ionized with an extremely high pulse energy and an ultra-high peak power, and is finally in an unprecedented high-temperature, high-pressure and high-density plasma state; cutting micro-nano-scale array holes with clean surfaces and clear hole depth and edges and with a hole diameter of 3.0

μm on a stainless steel material sheet with a thickness of 0.5 mm, i.e., processing the screen printing screen plate 3 having a mesh number of 3000-5000 of the micro-nano-scale array conductivity measurement electrode pattern;

step II. preparing a platinum electrode slurry 2: mixing a nano platinum powder having an average particle size of 0.8 μm, a ruthenium powder having a particle size of 0.1-0.3 μm, $Na_2O$ and an organic vehicle (a mixture of acetone and xylene with a mass ratio of 4:6) in a mass ratio of 55:15:1:29, dispersing and milling the mixture for 30 min in a three-roll mill, and discharging residual air under a vacuum degree of −80 KPa to −90 KPa by using a vacuum defoaming device to prepare the platinum electrode slurry 2;

step III. preparing an electrode carrier 4: selecting a silicon-based substrate having a thickness of 3 mm, a width of 20 cm and a length of 20 cm, etching a groove 5 having a depth of 0.2-0.4 μm on a surface of the silicon-based substrate, as shown in FIG. 2, wherein the cross section of the groove 5 is in a trapezoid shape with a wide upper part and a narrow lower part, and included angles between slope surfaces at two sides and a bottom surface of the groove 5 are 12°, and performing a nitridation treatment on the surface of the groove 5, wherein the nitridation treatment is performed by placing the silicon-based substrate in a nitrogen-containing medium at 500-540° C. for 30 h to allow newly formed active nitrogen atoms generated by decomposition of the medium to penetrate into a surface layer of the silicon-based substrate, so as to obtain a white bright layer having a thickness of 0.15-0.2 mm and a diffusion layer having a depth of 0-0.08 mm;

step IV. printing the platinum electrode slurry 2 onto the electrode carrier 4 by using the prepared screen printing screen plate 3 and a scraping plate 1 on a semi-automatic screen printer, scraping off the platinum electrode slurry outside the groove 5, and forming a patterned membrane electrode after the platinum electrode slurry 2 is leveled;

the printing comprises specific steps as follows:

(1) cleaning the electrode carrier 4, the screen printing screen plate 3 and the scraping plate 1 for 20 min by applying 30 KMz ultrasonic waves by using acetone, absolute ethanol and deionized water, and then putting the electrode carrier, the screen printing screen plate and the scraping plate into a fume hood for drying for 30 min at a temperature of 20° C.;

(2) adjusting an angle between the scraping plate 1 and a printing surface of the screen printing screen plate 3 to be 60°, and adjusting a distance between the screen printing screen plate 3 and the electrode carrier 4 to be 2 mm;

(3) operating the semi-automatic screen printer, as shown in FIG. 3, to enable the blade 1 of the scraping plate made of organic glass, chloroprene rubber, natural rubber and silicone rubber to move forward at a speed of 0.4 cm/s, applying a pressure of 100 KPa, pushing the platinum electrode slurry 2 to roll in front of the blade 1, and injecting the platinum electrode slurry 2 into the meshes of the screen printing screen plate 3, wherein since the slurry is a thixotropic fluid, the viscous friction in the slurry causes shear between laminar flows thereof; the slurry shear rate is the largest near the flange of the scraping plate 1 in contact with the screen printing screen plate 3, which generates the pressure required for injecting the slurry into the mesh, and in addition, the increase of the shear rate lowers the viscosity of the slurry, facilitating the injection into the mesh; when the scraping plate 1 completes the stamping action, the screen rebounds away from the surface of the electrode carrier 4, creating a low pressure area on the electrode carrier 4, and since there is a pressure difference between the atmospheric pressure above the screen and this low pressure area, the slurry is pushed from the mesh to the electrode carrier 4, and the platinum electrode slurry outside the groove 5 is scraped off, and the platinum electrode slurry 2 is allowed to stand for 10 min to level, forming a patterned membrane electrode having a micron-scale thickness; and step V. placing the electrode carrier 4 printed with the patterned membrane electrode into a blast drying oven for drying at 125° C. for 15 min, and finally placing the electrode into a microwave sintering furnace for sintering at a microwave sintering frequency of 2.25-2.55 GHz, a sintering power of 1.0 kw and a microwave frequency range of 300 GHz to 300 MHz;

in the sintering process, the preparation of the conductivity measurement electrode is completed by heating to 650° C. at a temperature rising rate of 5° C./min and maintaining the temperature for 35 min, then heating to 1200° C. at a heating rate of 10° C./min and maintaining the temperature for 25 min, and naturally cooling to room temperature.

Example 2

This example is the same as in Example 1, except that acetone is replaced with terpineol.

Example 3

This example is the same as in Example 1, except that xylene is replaced with ethyl cellulose.

Example 4

This example is the same as in Example 1, except that $Na_2O$ is replaced with MgO.

Example 5

This example is the same as in Example 1, except that $Na_2O$ is replaced with $TiO_2$.

Example 6

This example is the same as in Example 1, except that the stainless steel material sheet is replaced with an aluminium alloy.

Example 7

This example is the same as in Example 1, except that the stainless steel material sheet is replaced with brass.

Example 8

This example is the same as in Example 1, except that the ruthenium powder is replaced with the iridium powder.

Example 9

This comparative example is the same as in Example 1, except that the platinum powder, the ruthenium powder, $Na_2O$ and the organic vehicle (a mixture of acetone and xylene in a mass ratio of 4:6) are mixed in a mass ratio of 65:13:0.8:21.2.

Example 10

This example is the same as in Example 1, except that the platinum powder, the ruthenium powder, $Na_2O$ and the organic vehicle (a mixture of acetone and xylene in a mass ratio of 4:6) are mixed in a mass ratio of 60:14:1:25.

Comparative Example 1

This comparative example is the same as in Example 1, except that the platinum powder, the ruthenium powder, Na$_2$O and the organic vehicle (a mixture of acetone and xylene in a mass ratio of 4:6) are mixed in a mass ratio of 50:29:1:20.

Comparative Example 2

This comparative example is the same as in Example 1, except that the platinum powder, the ruthenium powder, Na$_2$O and the organic vehicle (a mixture of acetone and xylene in a mass ratio of 4:6) are mixed in a mass ratio of 70:25:1:5.

Comparative Example 3

This comparative example is the same as in Example 1, except that the ruthenium powder and Na$_2$O are not added to the platinum electrode slurry, and acetone is not added to the organic vehicle in the platinum electrode slurry.

Comparative Example 4

This comparative example is the same as in Example 1, except that Na$_2$O is not added to the platinum electrode slurry, and the platinum powder, the ruthenium powder and the organic vehicle (a mixture of acetone and xylene in a mass ratio of 4:6) are mixed in a mass ratio of 60:15:25.

Comparative Example 5

This comparative example is the same as in Example 1, except that the acetone is not added to the organic vehicle in the platinum electrode slurry, and the platinum powder, the ruthenium powder, Na$_2$O and xylene are mixed in a mass ratio of 50:29:1:20.

Comparative Example 6

This comparative example is the same as in Example 1, except that the ruthenium powder is not added to the platinum electrode slurry, and the platinum powder, Na$_2$O and the organic vehicle (a mixture of acetone and xylene in a mass ratio of 4:6) are mixed in a mass ratio of 60:1:39.

Comparative Example 7

This comparative example is the same as in Example 1, except that the there is no groove on the electrode carrier 4.

Electrode adhesion tests are performed on the conductivity measurement electrodes prepared in the above Examples and Comparative Examples and on the conductivity measurement electrodes prepared by magnetron sputtering according to the standard GB/T 17473.4-2008.

Meanwhile, conductivity measurement precision tests are performed on the conductivity measurement electrodes prepared in the above Examples and Comparative Examples and the conductivity measurement electrodes prepared by the magnetron sputtering according to the standard GB/T 6908-2008.

The test results are shown in Table 1.

TABLE 1

Results of conductivity performance test

| | Electrode adhesion (n/cm$^2$) | Conductivity measurement precision (mS/cm) |
|---|---|---|
| Example 1 | 1468 | 0.013 |
| Example 2 | 1501 | 0.021 |
| Example 3 | 1423 | 0.018 |
| Example 4 | 1589 | 0.029 |
| Example 5 | 1436 | 0.015 |
| Example 6 | 1476 | 0.009 |
| Example 7 | 1453 | 0.031 |
| Example 8 | 1526 | 0.024 |
| Example 9 | 1408 | 0.032 |
| Example 10 | 1509 | 0.012 |
| Comparative Example 1 | 1338 | 0.056 |
| Comparative Example 2 | 1275 | 0.063 |
| Comparative Example 3 | 753 | 0.123 |
| Comparative Example 4 | 924 | 0.087 |
| Comparative Example 5 | 1008 | 0.058 |
| Comparative Example 6 | 1369 | 0.094 |
| Comparative Example 7 | 1395 | 0.046 |

It can be seen from Table 1 that the conductivity measurement electrodes prepared in Examples 1-10 according to the present invention have significantly higher electrode adhesion and conductivity measurement precision than the conductivity measurement electrodes prepared in Comparative Examples 1-7, so that the conductivity measurement electrodes prepared under the process conditions defined in the present invention have the excellent performance, and the conductivity measurement electrodes with higher performance cannot be obtained beyond the scope defined in the present invention.

The above description of the disclosed examples enables those skilled in the art to implement or use the present invention. Various modifications to these examples will be readily apparent to those skilled in the art, and the generic principles defined herein may be applied to other examples without departing from the spirit or scope of the present invention. Thus, the present invention is not intended to be limited to these examples shown herein but is to accord with the broadest scope consistent with the principles and novel features disclosed herein.

What is claimed is:

1. A method for manufacturing a high-precision marine conductivity measurement electrode based on screen printing, comprising the following steps:
   step I preparing a screen printing screen plate: cutting micro-nano-scale array holes on a metal material sheet having a thickness of 0.5-1 mm by using a femtosecond laser technology to obtain the screen printing screen plate;
   step II preparing a platinum electrode slurry: mixing a nano platinum powder, a metal powder, a metal oxide and an organic vehicle, wherein the nano platinum powder has an average particle size of 0.08 μm, and the metal powder and the metal oxide have a particle size of 0.1-0.3 μm; dispersing and milling the mixture for 20-40 min in a three-roll mill, and discharging residual air under a vacuum degree of −80 KPa to −90 KPa by using a vacuum defoaming device to prepare the platinum electrode slurry;

step III preparing an electrode carrier: selecting a silicon-based substrate, etching a groove having a depth of 0.2-0.4 μm on a surface of the silicon-based substrate, and performing a nitridation treatment on a surface of the groove as the electrode carrier;

step IV printing the platinum electrode slurry onto the electrode carrier by using the prepared screen printing screen plate and a scraping plate on a semi-automatic screen printer, scraping off the platinum electrode slurry outside the groove, standing for 5-10 min, and forming a patterned membrane electrode having a micron-scale thickness after the platinum electrode slurry is leveled; and step V placing the electrode carrier printed with the patterned membrane electrode in a blast drying oven for drying for 10-20 min at 115-135° C., and finally performing microwave sintering to obtain the conductivity measurement electrode.

2. The method for manufacturing a high-precision marine conductivity measurement electrode based on screen printing according to claim 1, wherein in the step I, the micro-nano-scale array hole has a diameter of 2.6-4.2 μm, and the obtained screen printing screen plate has a mesh number of 3000-5000.

3. The method for manufacturing a high-precision marine conductivity measurement electrode based on screen printing according to claim 1, wherein in the step II, the metal powder is ruthenium or iridium.

4. The method for manufacturing a high-precision marine conductivity measurement electrode based on screen printing according to claim 1, wherein in the step II, the organic vehicle is a mixture of an organic solvent and an organic binder, the mass ratio of the organic solvent to the organic binder is 60-80:20-40, and the organic solvent is one or more of terpineol, acetone and methyl ethyl ketone, the organic binder is one or more of ethyl cellulose, polyvinyl butyral and xylene; the metal oxide is one or more of $Na_2O$, MgO and $TiO_2$.

5. The method for manufacturing a high-precision marine conductivity measurement electrode based on screen printing according to claim 1, wherein in the step II, the mass ratio of the platinum powder, the metal powder, the metal oxide and the organic vehicle is 55-65:13-15:0.1-1:20-30.

6. The method for manufacturing a high-precision marine conductivity measurement electrode based on screen printing according to claim 1, wherein in the step III, a cross section of the groove is in a trapezoid shape with a wide upper part and a narrow lower part, and included angles between slope surfaces at two sides and a bottom surface of the groove are 10°-15°.

7. The method for manufacturing a high-precision marine conductivity measurement electrode based on screen printing according to claim 1, wherein in the step III, the nitridation treatment is performed by placing the silicon-based substrate in a nitrogen-containing medium at 500-540° C. for 15-70 h to allow newly formed active nitrogen atoms generated by decomposition of the medium to penetrate into a surface layer of the silicon-based substrate, so as to obtain a white bright layer having a thickness of 0.15-0.2 mm and a diffusion layer having a depth of 0-0.08 mm.

8. The method for manufacturing a high-precision marine conductivity measurement electrode based on screen printing according to claim 1, wherein in the step IV, the printing comprises specific steps as follows:

S1. cleaning the electrode carrier, the screen printing screen plate and the scraping plate for 10-20 min by applying 20 KMz to 40 KMz ultrasonic waves by using acetone, absolute ethanol and deionized water, and then putting the electrode carrier, the screen printing screen plate and the scraping plate into a fume hood for drying for 20-30 min at a temperature of 20-25° C.;

S2. adjusting an angle between the scraping plate and a printing surface of the screen printing screen plate to be 60-80°, and adjusting a distance between the screen printing screen plate and the electrode carrier to be 1-3 mm;

S3. operating the semi-automatic screen printer to enable a scraping plate blade to move forward at a speed of 0.1-0.5 cm/s, applying a pressure of 80-300 KPa, pushing the platinum electrode slurry to roll in front of the scraping plate, injecting the platinum electrode slurry into meshes of the screen printing screen plate so as to reach the groove of the electrode carrier, scraping off the platinum electrode slurry outside the groove, standing for 5-10 min to level the platinum electrode slurry, and forming a patterned membrane electrode having a micron-scale thickness.

9. The method for manufacturing a high-precision marine conductivity measurement electrode based on screen printing according to claim 1, wherein in the step V, the electrode carrier printed with the patterned membrane electrode is placed into a microwave sintering furnace for sintering at a microwave sintering frequency of 2.25-2.55 GHz, a sintering power of 0.8-1.2 kw and a microwave frequency range of 300 GHz to 300 MHz.

10. The method for manufacturing a high-precision marine conductivity measurement electrode based on screen printing according to claim 1, wherein in the step V, in the sintering process, the preparation of the conductivity measurement electrode is completed by heating to 550-650° C. at a temperature rising rate of 5-10° C./min and maintaining the temperature for 25-35 min, then heating to 900-1200° C. at a heating rate of 10-15° C./min and maintaining the temperature for 20-35 min, and naturally cooling to room temperature.

\* \* \* \* \*